US010198750B1

(12) United States Patent
Johnson et al.

(10) Patent No.: US 10,198,750 B1
(45) Date of Patent: Feb. 5, 2019

(54) DEVICE STATE CAPTURE AND ANALYSIS

(71) Applicant: Facebook, Inc., Menlo Park, CA (US)

(72) Inventors: Michael Dudley Johnson, San Mateo, CA (US); Xiaoliang Wei, Sunnyvale, CA (US); Mukund Narasimhan, Bellevue, WA (US); Jackson Gabbard, San Francisco, CA (US); Eric Ruth, San Francisco, CA (US); Todd Krabach, Duvall, WA (US); Weizhe Shi, Mountain View, CA (US); Lior Berry, Sunnyvale, CA (US); Herry Sutanto, Redmond, WA (US); Hsueh-Fang Cheng, Sunnyvale, CA (US); Yan Yu, Sunnyvale, CA (US); Itamar Rosenn, San Francisco, CA (US); Alex Bain, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 84 days.

(21) Appl. No.: 15/134,873

(22) Filed: Apr. 21, 2016

Related U.S. Application Data

(63) Continuation of application No. 13/737,868, filed on Jan. 9, 2013, now Pat. No. 9,350,593.

(51) Int. Cl.
*G06F 15/16* (2006.01)
*G06Q 30/02* (2012.01)
*H04M 1/725* (2006.01)

(52) U.S. Cl.
CPC .... *G06Q 30/0267* (2013.01); *H04M 1/72522* (2013.01); *H04M 1/72569* (2013.01)

(58) Field of Classification Search
USPC .......... 709/201, 203, 204, 217, 223
See application file for complete search history.

(56) References Cited

U.S. PATENT DOCUMENTS

| | | | | |
|---|---|---|---|---|
| 8,055,602 B2* | 11/2011 | Tirpak | ............... | G06F 9/4443 706/47 |
| 2011/0066497 A1* | 3/2011 | Gopinath | ............... | G06Q 30/02 705/14.53 |
| 2013/0054775 A1* | 2/2013 | Lemus | ............... | G06F 9/461 709/224 |
| 2013/0110992 A1* | 5/2013 | Ravindra | ............... | H04W 8/18 709/220 |

* cited by examiner

Primary Examiner — Joseph E Avellino
Assistant Examiner — Marshall M McLeod
(74) Attorney, Agent, or Firm — Baker Botts L.L.P.

(57) ABSTRACT

In one embodiment, a method includes, by one or more server computing devices, receiving state data of a client computing device. The state data includes event data indicating events generated by or occurring at the client computing device and context data associated with the event data. The context data indicates device states of the client computing device that each coincide with one or more of the events and indicate a context of the one or more of the events. The method also includes, by one or more server computing devices, ordering the events and the device states in the event and context data into a state-data-review structure and analyzing the state-data-review structure to generate one or more recommendations on operation of the client computing device.

20 Claims, 5 Drawing Sheets

DEVICE STATE CAPTURE AND ANALYSIS

PRIORITY

This application is a continuation under 35 U.S.C. § 120 of U.S. patent application Ser. No. 13/737,868, filed 9 Jan. 2013.

TECHNICAL FIELD

This disclosure generally relates to computing device logging and analysis.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, software executing on a mobile device logs the mobile device state history as discrete events and associated contexts. Events may be user generated (e.g. swiping through an application, scrolling a page) or they may be software generated (e.g. software error events). Contexts are mobile device states or mobile device software states proximate in time to a given event. In particular embodiments, contexts may be the device identification, the network connection status, the battery reserve level, the data consumption by the device, the physical orientation of the device, or the image displayed by the mobile device software. The mobile device is capable of caching mobile device state histories when operating without a data network connection.

In particular embodiments, the mobile device state history is transmitted to a computing device for analysis when the device has a data network connection. The computing device may be a remote analysis server associated with a social-networking system. The computing device may receive the mobile device state history in batches if the data has been cached. In particular embodiments, the computing device will access past stores of mobile device state histories and merge the received data with corresponding stored data if found. The computing device will organize the received events into logical sets based on a sorting criteria. In some embodiments the sorting criteria may be based on chronology or categorization. The computing device will then analyze the logically sorted state histories to generate recommendations for future operation of the mobile device.

DESCRIPTION OF EXAMPLE EMBODIMENTS

Figure 1:
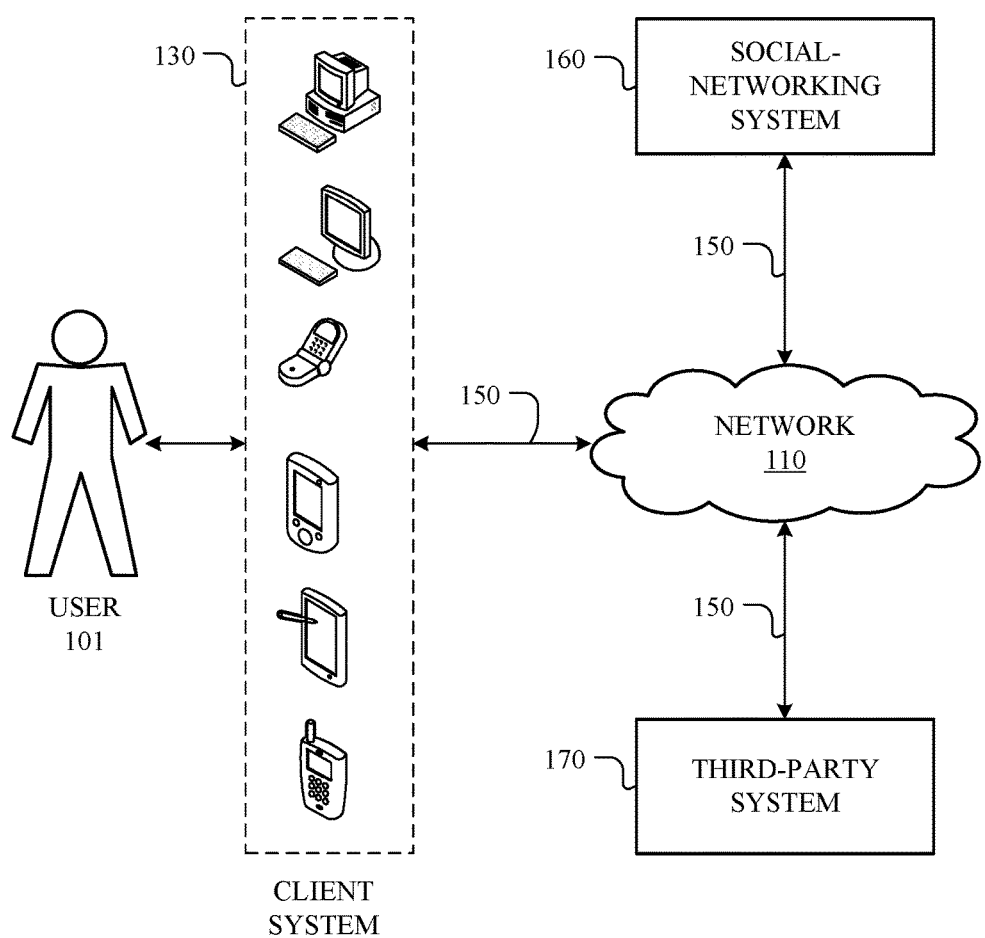
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via a network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. In particular embodiments, third-party system 170 may be a network-addressable computing system that can host client system state analysis. Third-party system 170 may generate, store, receive, and send client system state data, such as, for example, state histories comprised of one or more events and any linked associated contexts. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
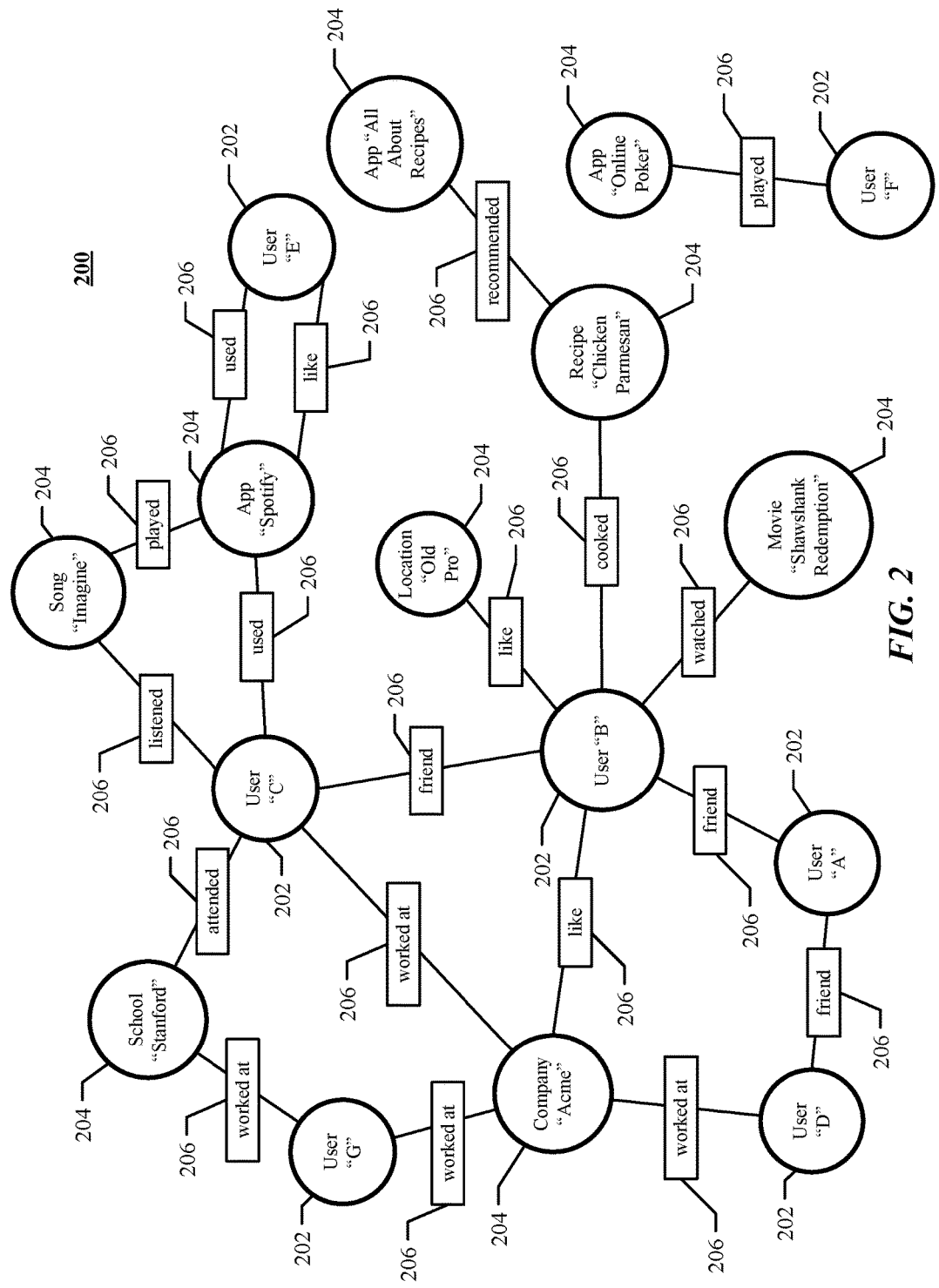
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user). In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0234009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/312,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0332998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g. "Who is viewing now or has viewed recently the page for COCA-COLA?"); light-weight connections (e.g. "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070319, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,508; U.S. Pat. No. 7,669,123, entitled "Dynamically Providing a News Feed About a User of a Social Network" and filed 11 Aug. 2006 as U.S. patent application Ser. No. 11/503,342; U.S. Patent Application Publication No. US 2008/0050475, entitled "Providing a News Feed Based on User Affinity in a Social Network Environment" and filed 11 Aug. 2006 as U.S. patent application Ser. No. 11/503,093; U.S. Patent Application Publication No. US 2012/0073428, entitled "Action Clustering for News Feeds" and filed 16 Sep. 2010 as U.S. patent application Ser. No. 12/884,010; U.S. Patent Application Publication No. US 2001/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 January 2007 as U.S. patent application Ser. No. 11/625,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0084101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

Figure 3:
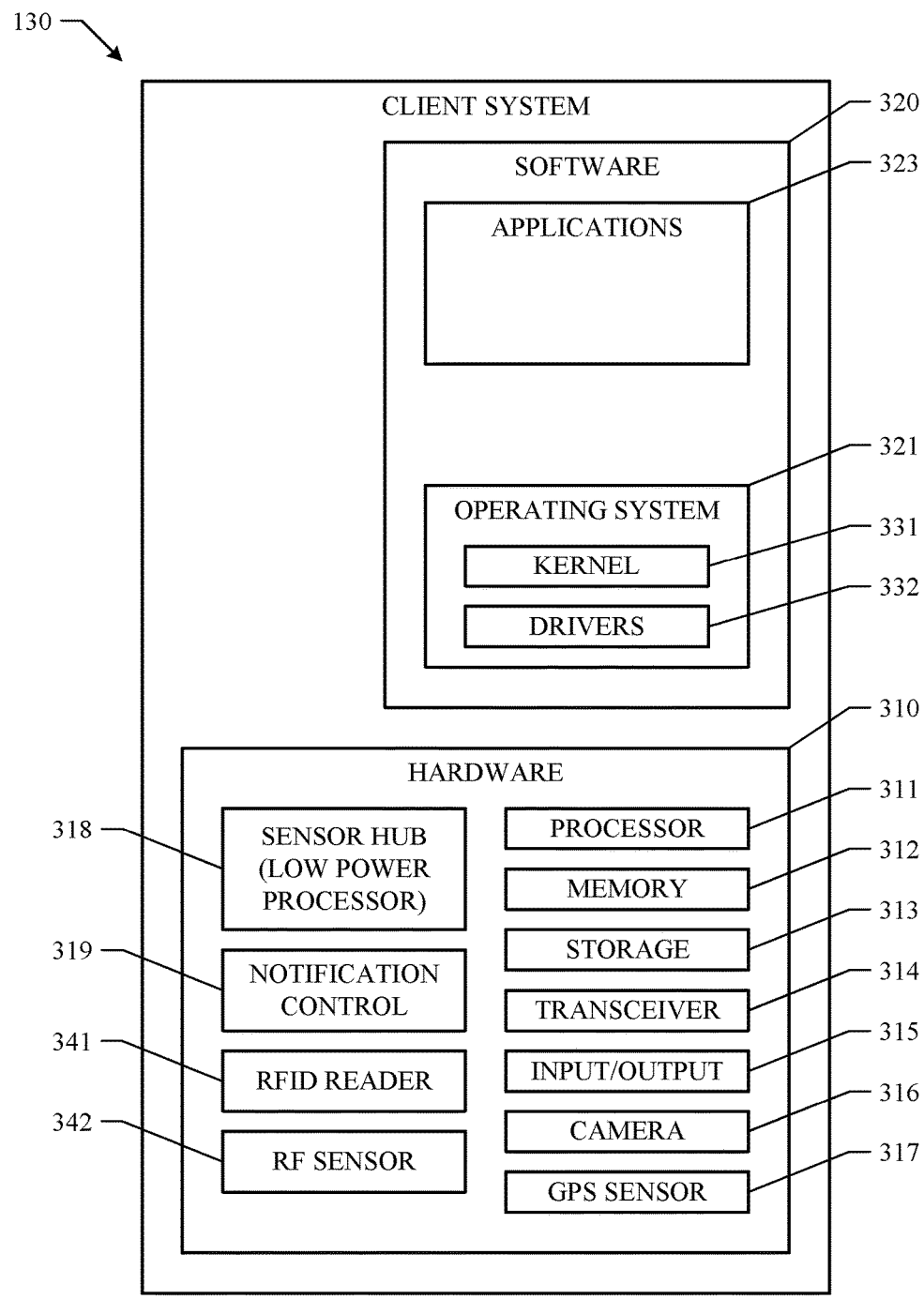
FIG. 3 illustrates an example mobile device.

In particular embodiments, a mobile device (e.g., client system 130) may include hardware, firmware, and software. FIG. 3 illustrates an example mobile-device client system 130. In particular embodiments, client system 130 may be a smart phone (e.g., iPhone or Blackberry), which is a mobile telephone that offers more advanced computing ability and connectivity than a traditional mobile phone. It may be considered as a handheld computer integrated with a mobile phone. In particular embodiments, client system 130 may be a netbook or tablet computer (e.g., iPad). In particular embodiments, client system 130 may be connected to a network through a wireless connection.

In particular embodiments, client system 130 may include hardware 310 and software 320. In particular embodiments, hardware 310 may include any number of hardware components such as, for example and without limitation, processor 311, memory 312, storage 313, transceiver 314, input/output device 315 (e.g., display, touch screen, keypad, microphone, speaker, etc.), camera 316, global positioning system (GPS) sensor 317, sensors hub 318, notification control switch 319, radio frequency identification (RFID) reader 341, radio frequency (RF) sensor 342, and so on. This disclosure contemplates any suitable hardware components. In particular embodiments, some or all of a user's user data may be stored in storage 313.

In particular embodiments, software 320 may include an operating system 321, which may include a kernel 331 and/or any number of device drivers 332 corresponding to some of the hardware components available on client system 130. Operating system 321 may be selected for client system 130 based on the actual type of device client system 130 is. For example, if client system 130 is a mobile device (e.g., a smart phone), then operating system 321 may be a mobile operating system such as, for example and without limitation, Microsoft's Windows Mobile, Google's Android, Nokia's Symbian, Apple's iOS, and Samsung's Bada.

In particular embodiments, one or more software applications 323 may be executed on client system 130. In particular embodiments, they may be native applications installed and residing on client system 130. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 316; a fifth application may allow the device user to receive and initiate VoIP and/or cellular network calls, a sixth application may allow the device user to receive and initiate instant messaging service (IM) messages (e.g., AOL Instant Messenger, ICQ, GChat, iMessage, Facebook Chat), and so on. In particular embodiments, there may be a software application that enables the device user to manage the notifications pushed to client system 130. Each software application 320 may have a user interface and may implement one or more specific functionalities. Each software application 320 may include one or more software modules implementing the individual functionalities. The executable code of software applications 320 may be stored in a computer-readable and non-transitory medium (e.g., storage 313 or memory 312) on mobile device 130.

In particular embodiments, one or more software applications 323 may be executed on client system 130 to log mobile device state histories. One or more mobile device state histories may be assembled into client system state data and stored in memory 312. In particular embodiments, a mobile device state history capture software application may be implemented using an appropriate programming platform, such as Java or Objective C. In particular embodiments, the state history capture software application may be an independent application as described above. In some embodiments, the state history capture software may be incorporated as part of operating system 321. In particular embodiments, client system state data stored in memory 312 may be transferred to storage 313 for long-term storage.

In particular embodiments, a mobile device state history comprises one or more events and one or more linked associated contexts. In particular embodiments, an event may be generated in response to a user input. For example, an event may be a swipe by a user interacting with a social networking software application. As another example, an event may be a user input corresponding to a mobile OS scrolling event call. As another example, an event may be an action instigated by a user within software application 323. In particular embodiments, an event may be a response automatically generated by software application 323 or operating system 321. For example, an event may be an error event generated by software application 323 or operating system 321. As another example, an event may be a call by operating system 321 corresponding to a particular battery level (e.g. low-battery indicator). As another example, an event may be a notification from operating system 321 indicating a change in the network connection type. As another example, an event may be generated when a social-networking software application makes a call to social-networking system 160.

In particular embodiments, a context may be a state of client system 130 at a time proximate to the time an event is generated. For example a context may be the network connection type of client system 130 (e.g. WiFi, 3G, LTE, CDMA, GSM). In some embodiments, a context may be the identification of the carrier network through which client system 130 is receiving cellular service. In particular embodiments, a context may be an identification of the model of client system, or the operating system type. In some embodiments, a context may be the identification of one or more software applications 323 operating on client system 130. In particular embodiments, a context may be the amount of data received by client system 130 over a particular time period. In some embodiments, a context may be data received from sensors 317 indicating the physical properties of client system 130 (e.g. whether the device is oriented in portrait or landscape mode, whether the device is in motion, the temperature of the device, whether the device had received an electrical shock, whether the device had come into contact with a liquid). In particular embodiments, a context may be the amount of electrical power consumed by client system 130 over a particular time period.

In particular embodiments, a context may be a state of one or more software applications 323 operating on client system 130 at a time proximate to the time an event is generated. In some embodiments, a context may be data indicating the information displayed on client system 130. For example, a context may be data indicating the distance scrolled on the screen of client system 130 by a user input generating an event. As another example, a context may be data indicating whether an advertisement was displayed on client system 130. In some embodiments, a context may be data indicating the position of an advertisement on the screen of client system 130. In some embodiments, a context may be data indicating the length of time for which an image is displayed. For example, a context may be data indicating the length of time for which an advertisement is displayed before a new event is generated based on a user action that caused the advertisement to no longer be displayed.

In particular embodiments, client system 130 transmits a mobile device state history to a remote analysis server as each state history is generated. In some embodiments, the remote analysis server is associated with social-networking system 160. In other embodiments, client system 130 caches mobile device state histories in storage 313 for later transfer of client system state data to a remote analysis server. In some embodiments, client system 130 transfers cached client system state data when one or more criteria are met. For example, client system 130 may cache mobile device state histories while client system 130 lacks a data network connection, and client device 130 then transmits the cached client system state data to the remote analysis server when client device 130 is later connected to a data network. As another example, client system 130 may cache mobile device state histories while client system 130 is operating below a given battery charge level. Client system 130 may then transfer the cached client system state data when client system 130 is connected via AC power. In particular embodiments, caching client system state data for later transfer to a remote analysis server allows client system 130 to log and utilize client system state data even when the system is operation in Offline or Airplane modes. This allows particular embodiments to benefit from client system state capture and analysis based on all relevant data, including data collected when communication with the remote analysis server is impossible.

In particular embodiments, a computing device receives client system state data comprising one or more mobile device state histories for analysis. In some embodiments, the computing device is client system 130. In other embodiments, the computing device may be a remote analysis server associated with social-networking system 160. In this embodiment, the implementation of logging the mobile device state history by client system 130 uses a minimum of system resources necessary to provide sufficient information to the system. For example, this embodiment does not require client system 130 to process or analyze the mobile device state histories. Rather, the processing and analysis of the data is handled by the remote analysis server.

In particular embodiments, the logging of mobile device state histories may be limited by global privacy settings of client system 130 or social-networking system 160. For example, the global privacy settings may restrict the gathering of personally identifiable information of all users younger than a given age. As another example, the global privacy settings may restrict the gathering of personally identifiable information of individuals who are not currently users of social-networking system 160. As another example, the global privacy settings may restrict the gathering of personally identifiable information of individuals who are not authorized users of client system 130.

In particular embodiments, the logging of mobile device state histories may be limited, altered, or precluded by individual user's privacy settings. In particular embodiments, client system 130 or social-networking system 160 may allow users to set privacy settings such as user opt-outs, user opt-ins, data hashing, or data anonymization, as appropriate. For example, the logging of mobile device state histories may require an explicit opt-in setting by the user. As another example, a user may opt-out of logging of mobile device state histories containing specified events or contexts via user privacy settings. In this example, any personally mobile device state histories associated with those events or contexts would not be stored, used, or transmitted by client system 130. In some embodiments, users may allow logging, use, and transmission of mobile device state histories but require that data be encrypted via data hashing via user privacy settings. For example, the mobile device state histories of a user may be logged by client system 130, transmitted to a remote analysis server that is associated with social-networking system 160, and used by the remote analysis server, but the personally identifiable information would be encrypted on client system 130 and in any transmissions by client system 130.

Figure 4:
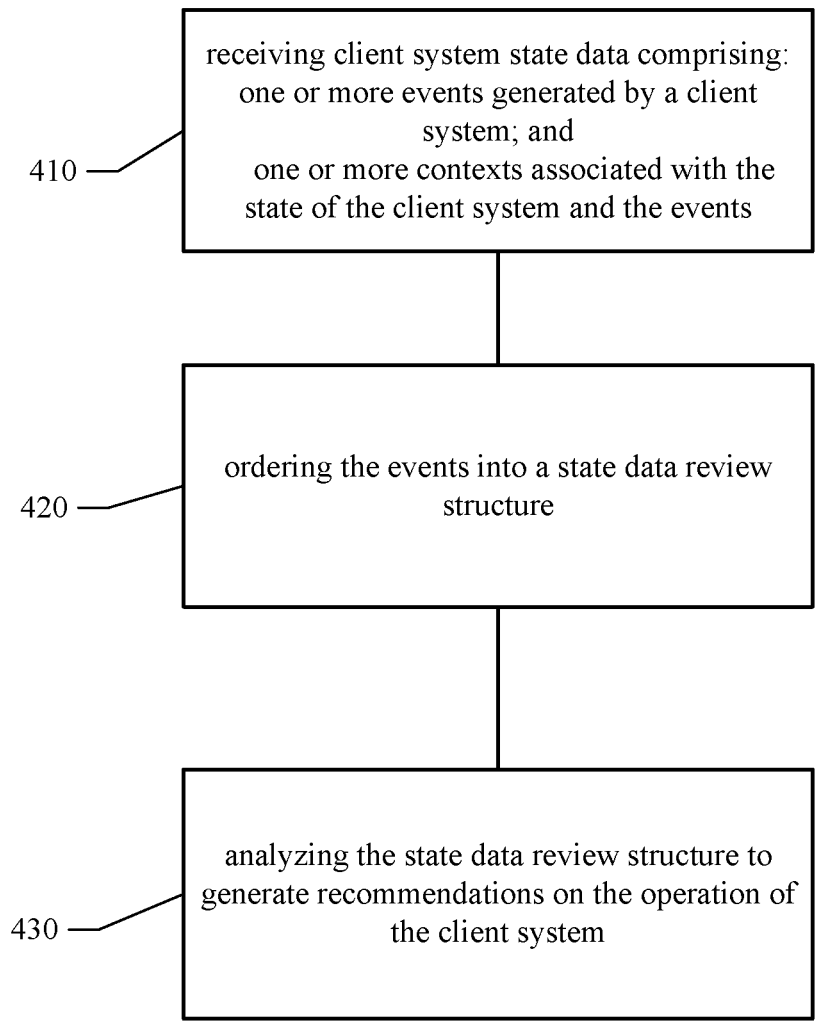
FIG. 4 illustrates an example method for analyzing captured client system state data.

FIG. 4 illustrates an example method 400 for analyzing captured client system state data. The method may begin at step 410, where one or more computing devices receive client system state data comprising: one or more events generated by a client system; and one or more contexts associated with the state of the client system and the events. In particular embodiments, the client system state data is received by the remote analysis server associated with social-networking system 160. In particular embodiments, the client system state data may be received in a single transfer due to caching of the data on client system 130. In some embodiments, the computing devices may receive a stream of data transmitted from client system 130 as a nearly real-time log of events and contexts. In some embodiments, the computing device may be client system 130, wherein the client system state data is received from the software application operating on the device.

In particular embodiments, the computing device will assign a time stamp to each batch of client system state data received. In some embodiments, this time stamp may represent the local time at the location of the computing device. In other embodiments, this time stamp may be computed based on a given starting point. For example, the computing device may assign the time of the reception of the first batch of client system state data as time zero, and then assign each subsequent batch a time stamp based on the elapsed period since time zero. In some embodiments, the contexts will contain time stamp data based on the time of logging by client system 130. In some embodiments, this will be the local time at the location of the client system.

In particular embodiments, the computing devices associated with social-networking system 160 will store client system state data in a database or server structure, such as third-party system 170. In some embodiments, the computing devices will associate the received client system state data received with client system state data previously stored in third-party system 170. For example, upon receipt of client system state data, the computing devices may extract the device identification data from the appropriate context or contexts and search previously stored client system state data for corresponding device identification data in third-party system 170. Upon locating a matching previously store batch of client system state data, the computing devices can merge the newly received mobile device state histories with the existing client system state data, producing a complete set of client system state data. The computing device may then receive the merged client system state data for analysis, or store the merged client system state data for later review.

In some embodiments, one or more of the mobile device state histories may use a decay factor in which the value of the correlation between the events and contexts decays with time. In this embodiment, mobile device state histories may be removed from the client system state data based on this decay factor. Moreover, different mobile device state histories may decay the historical data at different rates. Various decay mechanisms may be used for this purpose. For example, a mobile device state history may use a mathematical function, such as an exponential decay, to decay the value of a particular group of events and contexts. In another embodiment, the decay may be implemented by selecting only those mobile device state histories that have been received within a specific window of time, such as 24 hours or 30 days.

At step 420, the computing devices order the events into a state data review structure. The state data review structure is a logical construct ordering the events received based on a specified logical sorting criteria for organizing the received client system state data. In particular embodiments, the logical sorting criteria may be specified by a user of the computing devices on a individual client system state data basis. In some embodiments, a general logical sorting criteria may be implemented for all received client system state data. In particular embodiments, the computing devices may use a computer algorithm to determine the most appropriate logical sorting criteria. For example, the computing devices may use an expert system, or decision tree algorithm to select an appropriate logical sorting criteria.

In particular embodiments, the computing devices may use a chronological sorting algorithm as the logical sorting criteria. In some embodiments, the computing devices can use the time stamp contained in the contexts to determine the chronological order of the corresponding events. In some embodiments, the computing devices may use the time stamps assigned based on an assigned starting point as described in step 410. In some embodiments, the computing devices may use a reverse chronological sorting algorithm as the logical sorting criteria. In some embodiments, the computing devices may further impose a time-limitation to the logical sorting criteria, excluding mobile device state histories outside of a given time range. In some embodiments the given time range may be assigned across all client system state data. In some embodiments, the given time range may be assigned independently to each batch of received client system state data.

In particular embodiments, the computing devices may use a categorical sorting algorithm as the logical sorting criteria. For example, the computing devices may analyze each individual event to determine the type of stimulus generating each event and sorting said events into categories based on said stimulus. For example, the computing devices may order the events by category, grouping all user input events together as a state data review structure while further grouping all operating system exception event into a second state data review structure. In some embodiments, the computing devices may sort the events based on the software application or data each is associated with. For instance, the computing devices may group all advertising related events into a state data review structure, while grouping all social-networking related events into a second state data review structure.

In particular embodiments, the computing devices may implement more than one logical sorting criteria in a hierarchical sorting method. For example, the computing devices may first group all advertising associated events, then sort that group of events into a sub-group associated with user-input events. In some embodiments, the computing devices may further use a chronological sorting algorithm only after applying one or more categorical sorting algorithms.

It may be advantageous for the computing devices to sort a state data review structure chronologically for the purposes of analyzing general client system usage trends, or client system performance. For example, by reconstructing a chronological usage 'portrait', the computing devices can analyze metrics associated with ongoing use of the client system, such as data consumption or battery depletion. As another example, a chronological sorting method may allow the computing devices to analyze general usage trends of specific software applications 323 operating on client system 130. As another example, a chronological sorting method may assist the computing devices in debugging or error analysis on specific incidents in connection with a specific client system 130.

It may also be advantageous for the computing devices to sort a state data review structure categorically. For example, sorting client system state data into advertising categories may allow the computing devices to analyze the effectiveness of current advertisement types or targeting techniques. As another example, sorting client system state data into categories based on software application and further subdividing based on software error associated events, may allow the computing devices to analyze specific software errors across many client systems 130 simultaneously.

It may also be advantageous to implement more than one type of logical sorting criteria. By implementing a mixed hierarchical logical sorting algorithm, the computing devices may be able to group event data in a more fine-grained fashion, allowing more detailed analysis of the corresponding mobile device state histories. For example, by grouping event data associated with advertisements, and by further sorting this state data review structure chronologically, the computing devices may be able to analyze the amount of time for which a given advertisement is displayed before the user takes an action. As another example, by grouping events based on association with a given software application 323 and further sorting chronologically, the computing devices may be able to accurately compute the Time to Interact (TTI) for a variety of software applications 323 based on the device type, network connection type, and other contexts. The TTI may be computed based on different metrics, such as the time between the launch of a software application and a user's ability to interact with previously loaded data, the time between the launch of a software application and a user's ability to interact with newly loaded data, or the time between the launch of a software application an a user's ability to interact with fully downloaded high-bandwidth data such as photographs. In some embodiments, the TTI for different metrics can provide additional data regarding the operation of the client system 130. This disclosure contemplates any suitable manner of ordering the events into a state data review structure.

At step 430, the computing devices analyze the state data review structure to generate recommendations on the operation of the client system. In particular embodiments, the computing devices may use a decision-tree analysis on some or all of the events and contexts associated with the state data review structure. The computing devices may use historical events and associated contexts to develop decision nodes and chance nodes of the decision tree to predict future operation of client system 130. For example, based on historical data, a certain combination of events may predict an undesired client system operation, such as a software application failure, excessive TTI, increased data consumption, or increase battery depletion. In particular embodiments, the decision-tree analysis may be desirable in a system with a small number of potential client system variables. In particular embodiments the decision-tree analysis may be combined with other analysis techniques.

In particular embodiments, the computing devices may use a neural-network analysis on some or all of the events and contexts associated with the state data review structure. For example, the computing devices may implement a supervised learning neural network to find a function mapping input variables drawn from the contexts to associated events. The neural-networking analysis may try to minimize the mean-squared error between the network's predicted event and known past events. By minimizing this error, the network is able to develop an approximated function for predicting future events based on given contexts. In some embodiments, this analysis may be used to predict future advertising events or software error events, and could produce recommendations of future operation to maximize positive results.

In particular embodiments, the computing devices may use an expert-system analysis on some or all of the events and contexts associated with the state data review structure. The computing devices may build a knowledge base of the expert system based on historic data. By developing said knowledge base, the system may then run input contexts through the expert-system inference engine either in batches or serially to predict future events.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, the computing devices may use the recommendations generated by the analysis to alter the operation of client system 130. For example, the analysis of the state data review structure may indicate that a TTI exceeding a given threshold leads to a net reduction of users launching a corresponding software application 323 and the computing devices would correspondingly recommend alterations to the operation of the client system to reduce TTI beneath said threshold. The computing devices may then alter the operation of client system 130 to reduce TTI and minimize the loss of users. As another example, the analysis of the state data review structure may indicate that a redesign of the user interface (UI) of a software application has led to an increase in user time spent in the application and an increase in the number of advertisements interacted with by the users. The computing devices would recommend altering other software applications to implement similar UI changes and the computing devices may alter the operation of client system 130 to implement the recommendation. As another example, the analysis of the state data review structure may calculate different weights for advertisement targeting signals based on different types of user interactions (e.g. liking a photograph, liking a social-network status update) and the computing devices would recommend altering the advertisement targeting algorithms to account for this revised weighting. In particular embodiments, the computing devices may alter the operation of the advertisement targeting algorithms on client system 130 automatically in response to the recommendation.

Figure 5:
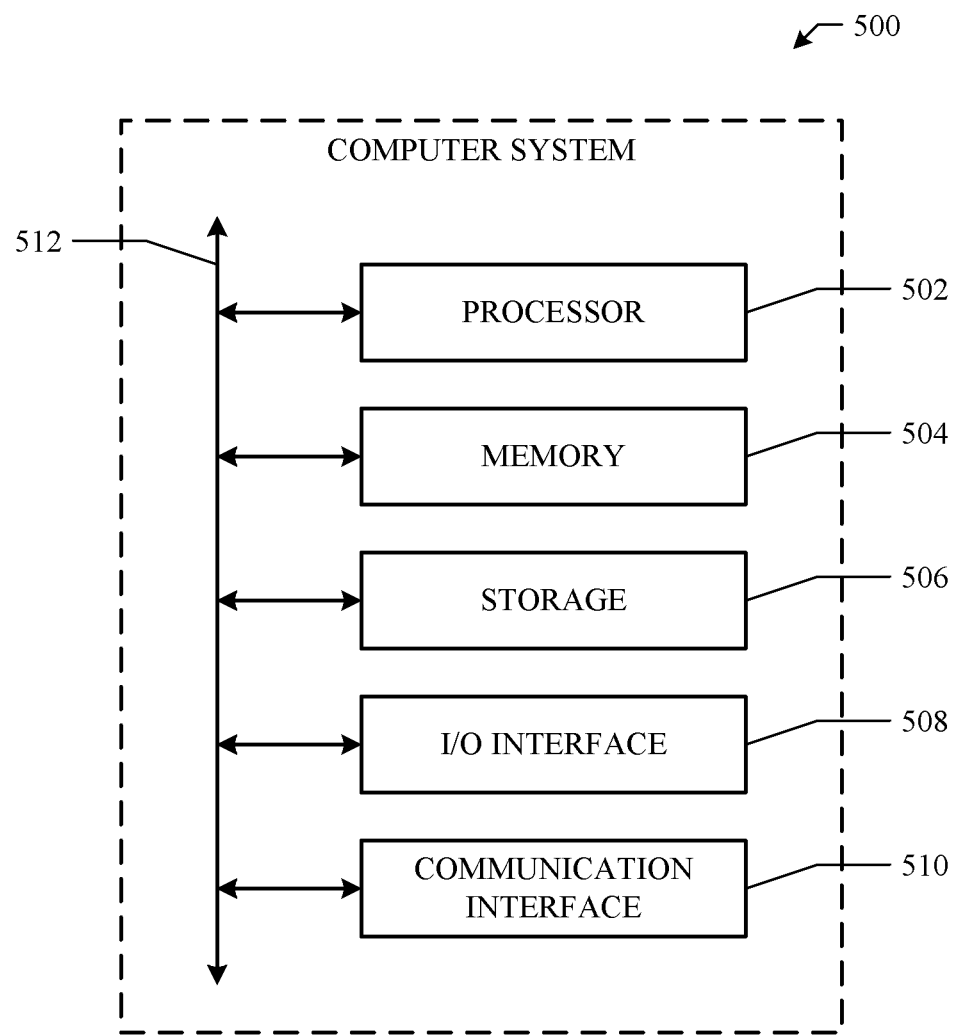
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more server computing devices, receiving state data for each of a plurality of applications on a client computing device, the state data comprising:
      event data indicating one or more events generated by or occurring at the client computing device; and
      context data associated with the event data, the context data indicating one or more device states of the client computing device that each:
         coincide with one or more of the events; and
         comprise application performance data associated with each of the plurality of applications;
   by one or more server computing devices, ordering the events and the device states in the event and context data into a state-data-review structure;
   by one or more server computing devices, determining, based on the state-data-review structure, a relationship in a frequency of use of each application between (1) a first set of the plurality of applications that perform a benchmark task within a threshold time and (2) a second set of the plurality of applications that exceed the threshold time in performance of the benchmark task, wherein the benchmark task includes starting an application, loading the application with newly downloaded data, and making the newly downloaded data available for user interaction;
   by one or more server computing devices, determining an alteration to a particular one of the plurality of applications in the second set to perform the benchmark task within the threshold time to increase the frequency of use based on the determined relationship; and
   by one or more server computing devices, implementing the alteration to the particular application on the client computing device.

2. The method of claim 1, wherein the implementing the alteration comprises transmitting instructions for altering a user interface design of the particular application, and wherein the instructions comprise one or more recommendations for the user interface design.

3. The method of claim 1, wherein the ordering the events and the device states in the event and context data into a state-data-review structure further comprises:
   determining a relative time associated with each of the indicated contexts; and
   chronologically ordering the event data and associated context data based on the relative times.

4. The method of claim 1, wherein the ordering the events and the device states in the event and context data into a state-data-review structure further comprises:
   categorizing each of the events based on its type of generation; and
   organizing the event data and associated context data into one or more structured groups based on the categorization.

5. The method of claim 1, wherein the events comprise:
   data generated in response to a user input to the client system;
   data generated by an action instigated by a user within a software application; or
   data generated by an automatic response of a software application.

6. The method of claim 1, wherein the context data comprises:
    a state of the client system at a first time; or
    a state of a software application at the first time.

7. The method of claim 6, wherein the first time is proximate to a time associated with the one or more events logged associated with the context data.

8. The method of claim 2, wherein at least one of the recommendations comprises a reduction in a time to interact associated with a software application executed by the client computing device.

9. The method of claim 2, wherein at least one of the recommendations comprises one or more alterations to one or more user interfaces displayed by the client computing device.

10. The method of claim 9, wherein at least one of the user interfaces is associated with a software application stored on or executed by the client computing device.

11. The method of claim 2, wherein at least one of the recommendations comprises one or more adjustments to one or more advertisement targeting algorithms stored at least in part on or computed at least in part by the client computing device.

12. One or more computer-readable non-transitory storage media embodying software that is operable when executed to:
    receive state data for each of a plurality of applications on a client computing device, the state data comprising:
        event data indicating one or more events generated by or occurring at the client computing device; and
        context data associated with the event data, the context data indicating one or more device states of the client computing device that each:
            coincide with one or more of the events; and
            comprise application performance data associated with each of the plurality of applications;
    order the events and the device states in the event and context data into a state-data-review structure;
    determine, based on the state-data-review structure, a relationship in a frequency of use of each application between (1) a first set of the plurality of applications that perform a benchmark task within a threshold time and (2) a second set of the plurality of applications that exceed the threshold time in performance of the benchmark task, wherein the benchmark task includes starting an application, loading the application with newly downloaded data, and making the newly downloaded data available for user interaction;
    determine an alteration to a particular one of the plurality of applications in the second set to perform the benchmark task within the threshold time to increase the frequency of use based on the determined relationship; and
    implement the alteration to the particular application on the client computing device.

13. The media of claim 12, wherein the software is further operable when executed to adapt the operation of the client system based on the analysis of the state-data-review structure.

14. The media of claim 12, wherein ordering the events and the device states in the event and context data into a state-data-review structure further comprises:
    determining a relative time associated with each of the indicated contexts; and
    chronologically ordering the event data and associated context data based on the relative times.

15. The media of claim 12, wherein ordering the events and the device states in the event and context data into a state-data-review structure further comprises:
    categorizing each of the events based on its type of generation; and
    organizing the event data and associated context data into one or more structured groups based on the categorization.

16. The media of claim 12, wherein the events comprise:
    data generated in response to a user input to the client system;
    data generated by an action instigated by a user within a software application; or
    data generated by an automatic response of a software application.

17. The media of claim 12, wherein the context data comprises:
    a state of the client system at a first time; or
    a state of a software application at the first time.

18. The media of claim 17, wherein the first time is proximate to a time associated with the one or more events logged associated with the context data.

19. The media of claim 12, wherein at least one of the recommendations comprises a reduction in a time to interact associated with a software application executed by the client computing device.

20. A system comprising: one or more processors; and a non-transitory memory coupled to the processors comprising instructions executable by the processors, the processors operable when executing the instructions to:
    receive state data for each of a plurality of applications on a client computing device, the state data comprising:
        event data indicating one or more events generated by or occurring at the client computing device; and
        context data associated with the event data, the context data indicating one or more device states of the client computing device that each:
            coincide with one or more of the events; and
            comprise application performance data associated with each of the plurality of applications;
    order the events and the device states in the event and context data into a state-data-review structure;
    determine, based on the state-data-review structure, a relationship in a frequency of use of each application between (1) a first set of the plurality of applications that perform a benchmark task within a threshold time and (2) a second set of the plurality of applications that exceed the threshold time in performance of the benchmark task, wherein the benchmark task includes starting an application, loading the application with newly downloaded data, and making the newly downloaded data available for user interaction;
    determine an alteration to a particular one of the plurality of applications in the second set to perform the benchmark task within the threshold time to increase the frequency of use based on the determined relationship; and
    implement the alteration to the particular application on the client computing device.

* * * * *